US008561200B2

(12) United States Patent
Costa et al.

(10) Patent No.: US 8,561,200 B2
(45) Date of Patent: Oct. 15, 2013

(54) METHOD AND SYSTEM FOR CONTROLLING ACCESS TO COMMUNICATION NETWORKS, RELATED NETWORK AND COMPUTER PROGRAM THEREFOR

(75) Inventors: Luciana Costa, Turin (IT); Simone Ruffino, Turin (IT); Patrick Stupar, Turin (IT)

(73) Assignee: Telecom Italia S.p.A., Milan (IT)

( * ) Notice: Subject to any disclaimer, the term of this patent is extended or adjusted under 35 U.S.C. 154(b) by 1224 days.

(21) Appl. No.: 11/630,415

(22) PCT Filed: Jun. 24, 2004

(86) PCT No.: PCT/EP2004/006831
§ 371 (c)(1),
(2), (4) Date: Dec. 21, 2006

(87) PCT Pub. No.: WO2006/000239
PCT Pub. Date: Jan. 5, 2006

(65) Prior Publication Data
US 2008/0069105 A1    Mar. 20, 2008

(51) Int. Cl.
*G06F 21/00* (2013.01)
(52) U.S. Cl.
USPC .......................................................... 726/26
(58) Field of Classification Search
USPC ............................................. 726/2, 4, 26–30
See application file for complete search history.

(56) References Cited

U.S. PATENT DOCUMENTS

| 7,171,555 | B1 * | 1/2007 | Salowey et al. | 713/156 |
| 2002/0039357 | A1 * | 4/2002 | Lipasti et al. | 370/338 |
| 2003/0179742 | A1 * | 9/2003 | Ogier et al. | 370/351 |
| 2003/0235175 | A1 * | 12/2003 | Naghian et al. | 370/338 |
| 2005/0021956 | A1 * | 1/2005 | Genty et al. | 713/170 |

FOREIGN PATENT DOCUMENTS

| EP | 1 102 430 A1 | 5/2001 |
| EP | 1 239 630 A2 | 9/2002 |
| EP | 1 289 197 A1 | 3/2003 |
| WO | WO 02/63847 A2 | 5/2002 |
| WO | WO 2004/001521 A2 | 12/2003 |

OTHER PUBLICATIONS

IEEE Std 802.11-1997, Information Technology—Telecommunications and Information Exchange Between Systems—Local and Metropolitan Area Networks—Specific Requirements, "Part 11: Wireless LAN Medium Access Control (MAC) and Physical Layer (PHY) Specifications", pp. i-xiv and 1-28, (1997).

(Continued)

*Primary Examiner* — Brandon Hoffman
*Assistant Examiner* — Anthony Brown
(74) *Attorney, Agent, or Firm* — Finnegan, Henderson, Farabow, Garrett & Dunner, L.L.P.

(57) ABSTRACT

A system for controlling access of a mobile terminal to a communication network including a set of terminals, wherein said mobile terminal obtains access to the network as a result of a successful authentication procedure. The system includes an authenticator module for performing the authentication procedure of the mobile terminal and a communication mechanism configured for making the successful outcome of the authentication procedure known to the terminals in the set. The mobile terminal is thus permitted to access the network via any of the terminals in the set based on the authentication procedure.

56 Claims, 10 Drawing Sheets

(56) References Cited

OTHER PUBLICATIONS

"Information Technology—Telecommunications and information exchange between systems—Local and metropolitan area networks—Specific requirements—Part 11: Wireless LAN Medium Access Control (MAC) and Physical Layer (PHY) specifications", IEEE Std. 802.11-1997, p. 1 of 466, (1997).

"Draft Amendment to Standard for Telecommunications and Information Exchange Between Systems—LAN/MAN specific Requirements—Part 11: Wireless Medium Access Control (MAC) and physical layer (PHY) specifications: Medium Access Control (MAC) Security Enhancements", IEEE Std 802.11i/D7.0, pp. i-viii and 1-144, (2003).

"IEEE Standard for Local and metropolitan area networks—Port-Based Network Access Control", IEEE Std 802.1x-2001, pp. i-viii, 1-134 and 145-180, (Jan. 2001).

Blunk, et al., "PPP Extensible Authentication Protocol (EAP)", Network Working Group, rfc2284, pp. 1-15, (Mar. 1998).

Fitzek, et al., "Authentication and Security in IP based Multi-Hop Networks", 7th WWRF Meeting in Eindhoven, The Netherlands, pp. 1-5, (Dec. 3-4, 2002).

Clausen, et al., "Optimized Link State Routing Protocol (OLSR)", Network Working Group, rfc3626, pp. 1-75, (Oct. 2003).

Palekar, et al., "Protected EAP Protocol (PEAP) Version 2", PPPEXT Working Group, Internet-Draft, pp. 1-72, (Oct. 26, 2003).

\* cited by examiner

METHOD AND SYSTEM FOR CONTROLLING ACCESS TO COMMUNICATION NETWORKS, RELATED NETWORK AND COMPUTER PROGRAM THEREFOR

CROSS REFERENCE TO RELATED APPLICATION

This application is a national phase application based on PCT/EP2004/006831, filed Jun. 24, 2004, the content of both of which is incorporated herein by reference.

FIELD OF THE INVENTION

The invention relates to techniques for controlling access to a communication network.

The invention was devised in view of the preferred application to controlling, via authentication procedures, access to communication networks such as a hybrid Mobile Ad-hoc NETwork (MANET). However, reference to this preferred field of application is not to be construed in a limiting sense of the scope of the invention.

DESCRIPTION OF THE RELATED ART

The model of Ad-hoc Network or Independent Basic Service Set (IBSS) is described in the standard "Information technology—Telecommunications and information exchange between systems—Local and metropolitan area networks—Specific Requirements Part 11: Wireless LAN Medium Access Control (MAC) and Physical Layer (PHY) Specifications", IEEE Std. 802.11-1997, 1997, whilst the aspects of security linked to the authentication and, in particular, to the link layer, are addressed in the draft "Draft Amendment to Standard for Telecommunications and Information Exchange Between Systems—LAN/MAN Specific Requirements—Part 11: Wireless Medium Access Control (MAC) and physical layer (PHY) specifications: Medium Access Control (MAC) Security Enhancements", <IEEE Std 802.11i/D7.0>, August 2003.

More precisely, a Robust Security Network Association (RSNA) can be established between two peers. This association is based upon the use of the standard of the Institute of Electrical & Electrics Engineers "Standards for Local and metropolitan area networks: Port-Based Network Access Control", IEEE Std 802.1x-2001, January 2001, as technique for the control of accesses. In this regard, the current proposal of 802.11i envisages that, after the authentication procedure 802.1x, there will start a sequence of negotiation of encoding keys based upon Extensible Authentication Protocol Over Local Area Network (EAPOL)-Key messages. In brief, a 4-way handshake enables the session key to be derived starting from a shared secret obtained as a result of the authentication method implemented on Extensible Authentication Protocol, as described in L. Blunk, J. Vollbrecht, "PPP Extensible Authentication Protocol (EAP)", <rfc2284>, March 1998. The Extensible Authentication Protocol Over Local Area Network—Key messages are also used for implementing functions of re-negotiation and of distribution for the multicast/broadcast keys.

As is well known, references of the "rfc- . . . " type (and, similarly, references of the "ietf- . . . " type) identify documents that can be retrieved at the date of filing of the instant application with the IETF website at www.ietf.org.

By adopting such an approach, a device that has already been authenticated must, in fact, actuate the authentication procedure with each of the nodes with which it is associated, which each time entails two 4-way handshakes.

According to the IEEE 802.11i approach, the node would have to execute twice, with every other node of the ad-hoc network, a 4-way handshake: one first time to receive the broadcast key of the node with which it performs the handshake; and one second time for transmitting its own broadcast key thereto. This becomes expensive if also the mobility of the terminals is considered; it means that, if the ad-hoc network is made up of N nodes, in the worst case in which a node has to be authenticated with all the others, N(N-1) 4-way handshakes are necessary, and the fact that the node has been previously authenticated is of no help at all.

Finally, an important aspect which must be taken into consideration is that the model for security in an Independent Basic Service Set described in "Draft Amendment to Standard for Telecommunications and Information Exchange Between Systems—LAN/MAN Specific Requirements—Part 11: Wireless Medium Access Control (MAC) and physical layer (PHY) specifications: Medium Access Control (MAC) Security Enhancements", <IEEE Std 802.11i/D7.0>, August 2003, is based upon the following assumptions:

i) the authentication procedure described is valid in the case where the credentials used during the process of Extensible Authentication Protocol authentication have previously been issued and preinstalled on each terminal within a common administrative domain;

ii) the wireless communication between two terminals is direct, i.e., the case of a peer-to-peer transmission through a multi-hop network is not taken into consideration. More precisely, <IEEE Std 802.11i/D7.0> is not adapted for use of other terminals as routers for forwarding data to more remote terminals. This assumption is motivated in that the model presented for carrying out the authentication does not define how to protect the information of Network Topology transmitted by the terminal for the purpose of the set-up of the ad-hoc network itself and of the routing of the traffic. This information, if not protected, can be subject to attacks from other terminals, including ones belonging to the same ad-hoc network.

The document by F. Fitzek, A. Kopsel, P. Seeling "Authentication and Security in IP based Multi-Hop Networks", 7th WWRF Meeting in Eindhoven, the Netherlands, 3-4 Dec. 2002, describes an application of the standard IEEE802.1x to the case of a multi-hop network used in conjunction with the authentication method known as EAP-AKA (Extensible Authentication Protocol-Authentication and Key Agreement). The context is that of an ad-hoc network with a 802.11 link towards an Access Point, which consequently functions as gateway to the wired network. From the standpoint of authentication, the terminals already authenticated operate from a Virtual Access Point. The communication between the node and the network is rendered secure through the use of a secret key generated during the authentication stage.

EP-A-1 102 430 describes a method for creating security relationships in an ad-hoc network not having particular on-line connections to a particular server for getting desired public keys or certificates, required to create trust relations. A node that intends to join an ad-hoc network broadcasts its public key. If within the Mobile Ad-hoc NETwork there exists a node which possesses a security relationship with the requesting node, this latter node will send, to the requesting node, all the public keys of the other nodes of the network and, vice versa, the public key of the requesting node to the rest of the network.

WO-A-02/063847 specifies a method of providing certificate issuance and revocation checks involving mobile devices in a MANET (mobile ad hoc network). The wireless devices communicate with each other via Bluetooth wireless technology in the MANET, with an access point to provide connectivity to the Internet. A Certificate Authority (CA) distributes certificates and certification revocation lists to the devices via the access point. Each group of devices has the name of the group associated with the certificate and signed by the CA. A device that is out of the radio range of the access point may still connect to the CA to validate a certificate or download the appropriate certification revocation list by having all the devices participate in the MANET.

In EP-A-1 289 197 an arrangement is disclosed focusing on the model of service and on the decomposition into "elementary functions": a general architecture is defined where the ad-hoc network is under control of the mobile-radio network. A mobile telecommunication device for operating multi-media applications in a mobile ad-hoc communication network comprises an ad-hoc computing manager unit for managing and providing multimedia applications on the basis of a communication with one or more other mobile telecommunication devices. Thereby, said ad-hoc computing manager unit controls a device discovery manager unit for detecting the availability of one or more mobile telecommunication devices and/or at least one mobile ad-hoc communication network, a service discovery manager unit for providing available services from and/or for said mobile ad-hoc communication network, and a tuple space manager unit for providing a tuple space functionality for multimedia applications within the context of at least one mobile ad-hoc communication network.

Document WO-A-2004/001521 discloses an ad hoc communication system established between terminals with the aid of a network. Terminals equipped with a non-cellular interface may establish a high data rate peer-to-peer or multi-hop ad hoc connection with the support of a cellular network. The cellular network may provide signaling for user authentication, peer identification, key distribution for a secure non-cellular connection set-up, radio resources management messages, routing assistance information, as well as charging and billing for the service. A non-cellular link may be used for fast and secure ad hoc communication between the terminals. Signaling may be transported either over a non-cellular access network or, using dual-mode terminals, over the cellular RAN. A combination of the signaling transports is also possible.

OBJECT AND SUMMARY OF THE INVENTION

The prior arrangements described in the foregoing fail to tackle and solve a number of problems. For instance, the need exists of preventing a terminal from accessing a network such as e.g. a Mobile Ad-hoc NETwork, i.e., from being inserted within the routing process and receiving a valid IP address, before it has been authenticated and authorized.

Additional, it may be advisable to establish, for each pair of nodes in a network such as an ad-hoc network, a security relationship without forcing the nodes to restore said security relationships whenever they are encountered. In other words, the problem consists in how to prevent a peer from having to be authenticated each time with all the members of a network with which it intends to set up a communication, i.e. how the security relationship multi-hop network may be distributed in a secure way in a multi-hop network.

Furthermore, the fact has to be taken into account that authentication of a node is a fundamental requirement not only for the purpose of preventing access of fraudulent nodes, but also for the formation of the ad-hoc network itself. In addition to this, it is necessary to consider the aspects of security from the routing standpoint. The routing messages must be identifiable, i.e., authenticable, in order to prevent transmission of false routing information and attacks on services, such as Domain Name System (DNS) or Dynamic Host Configuration Protocol (DHCP). In that respect, a specific aspect of the Mobile Ad-hoc NETwork lies, however, in the mobility of the terminals. Generation and use of broadcast-encoding keys becomes of fundamental importance in the case of an ad-hoc network, since almost all of the routing messages necessary for the set-up of the network itself are transmitted in broadcast mode and hence must be protected. Once again for reasons of security, it is preferrable for the broadcast key not to be common to the ad-hoc network but to be different for each node. A node, for the purpose of joining an ad-hoc network and receiving the routing messages, must know the aforesaid broadcast keys.

The methods of authentication and management of the cryptography keys, designed and implemented in a "fixed" environment, can encounter many difficulties in being applied. Indeed, the fact that the terminals are mobile implies that the nodes with which security relationships are to be established change over time.

Moreover, in peer-to-peer communication between two mobile terminals of the same Mobile Ad-hoc NETwork, in order to establish an IP communication in a secure way, two terminals must possess a shared and secret cryptographic key, which is valid only for the time of one session (for this reason this key is often referred to as Session Key). There exist different ways for deriving this security relationship; for example, the protocol IPSEC envisages the stage of negotiation managed with IKE (Internet Key Exchange) or IKEv2. The invention facilitates derivation of the shared key since all the terminals possess the public keys (authenticated by the Authentication, Authorization, and Accounting server) of any other terminal.

The object of the invention is thus to provide an improved arrangement adapted to satisfy the needs previously described, while dispensing with the intrinsic drawbacks of the prior art arrangements discusses in the foregoing.

According to the present invention, that object is achieved by means of a method having the features set forth in the claims that follow. The invention also relates to a corresponding system, a related network as well as a related computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

A preferred embodiment of the invention is a system for controlling access of a mobile terminal to a communication network including a set of terminals wherein the mobile terminal obtains access to the network as a result of a successful authentication procedure. The system includes:

an authenticator module for performing the authentication procedure of the mobile terminal, and a communication mechanism configured for making the successful outcome of said authentication procedure known to the terminals in said set.

The mobile terminal is thus permitted to access the network via any of the terminals in said set based on said authentication procedure.

BRIEF DESCRIPTION OF THE ANNEXED DRAWINGS

The invention will now be described, by way of example only, with reference to the enclosed figures of drawing, wherein:

FIG. 1 shows an example of mobile terminal in a hybrid network;

FIG. 2 describes a typical scenario of a hybrid Mobile Ad-hoc NETwork;

Figure 6:
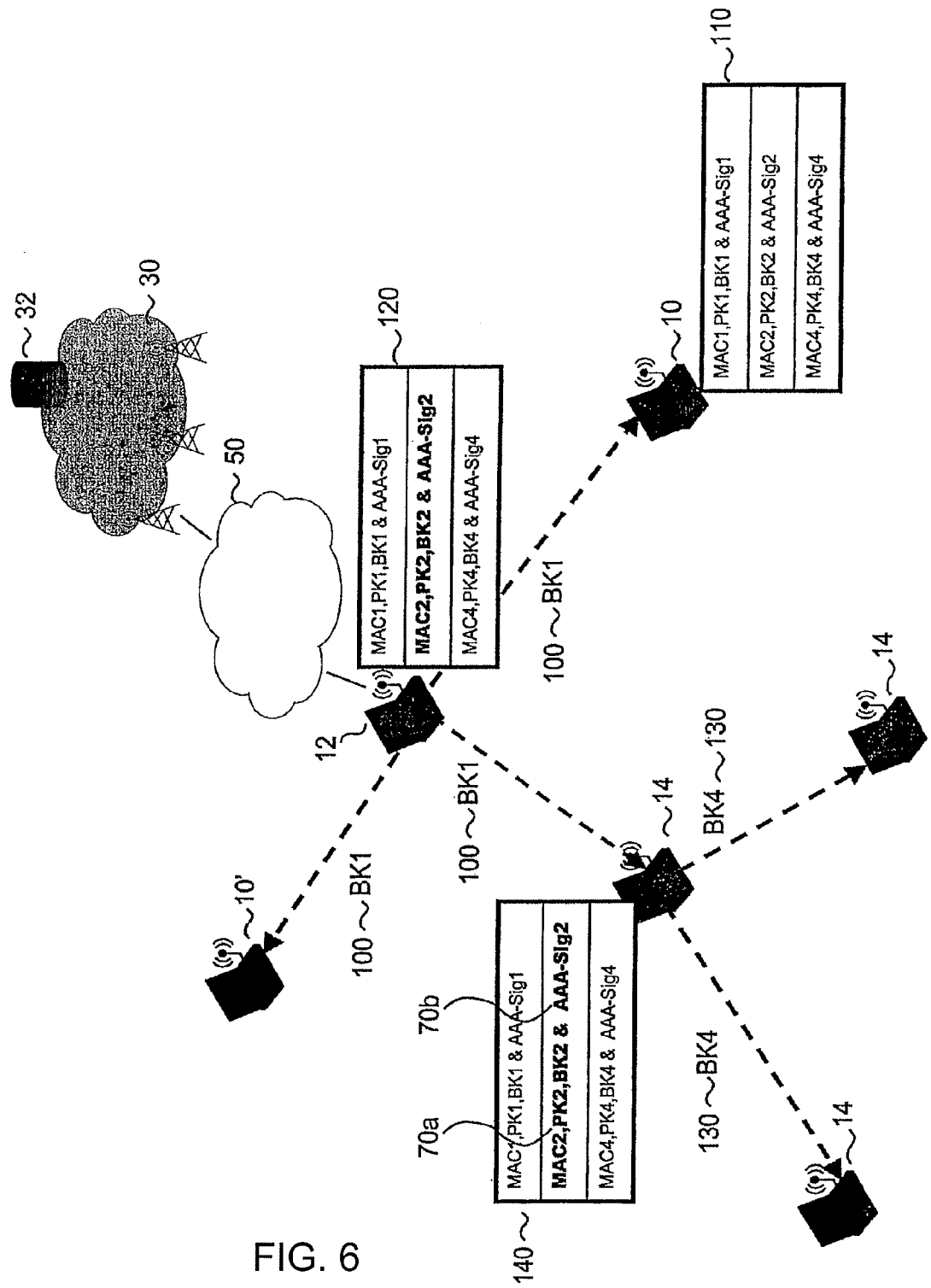
Figure 7:
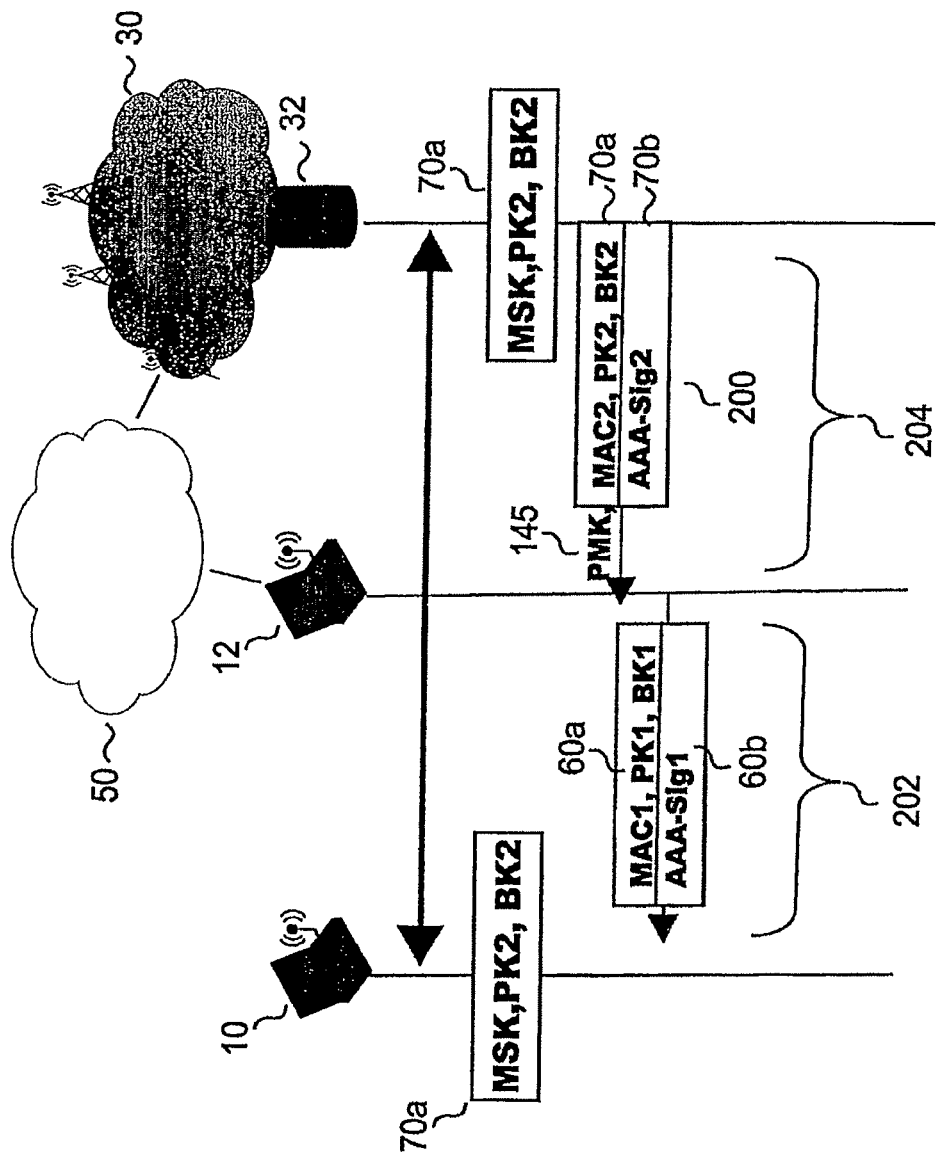
Figure 8:
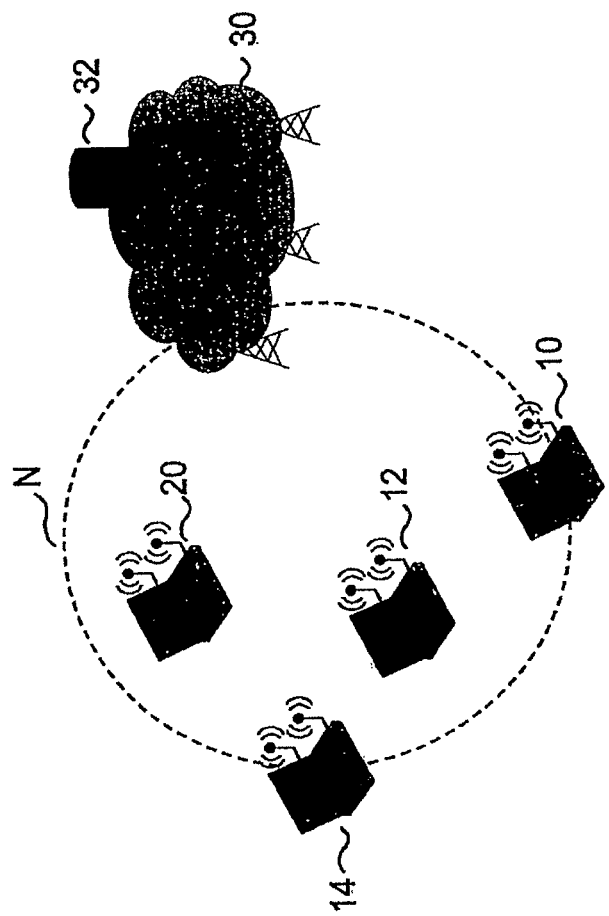
Figure 9:
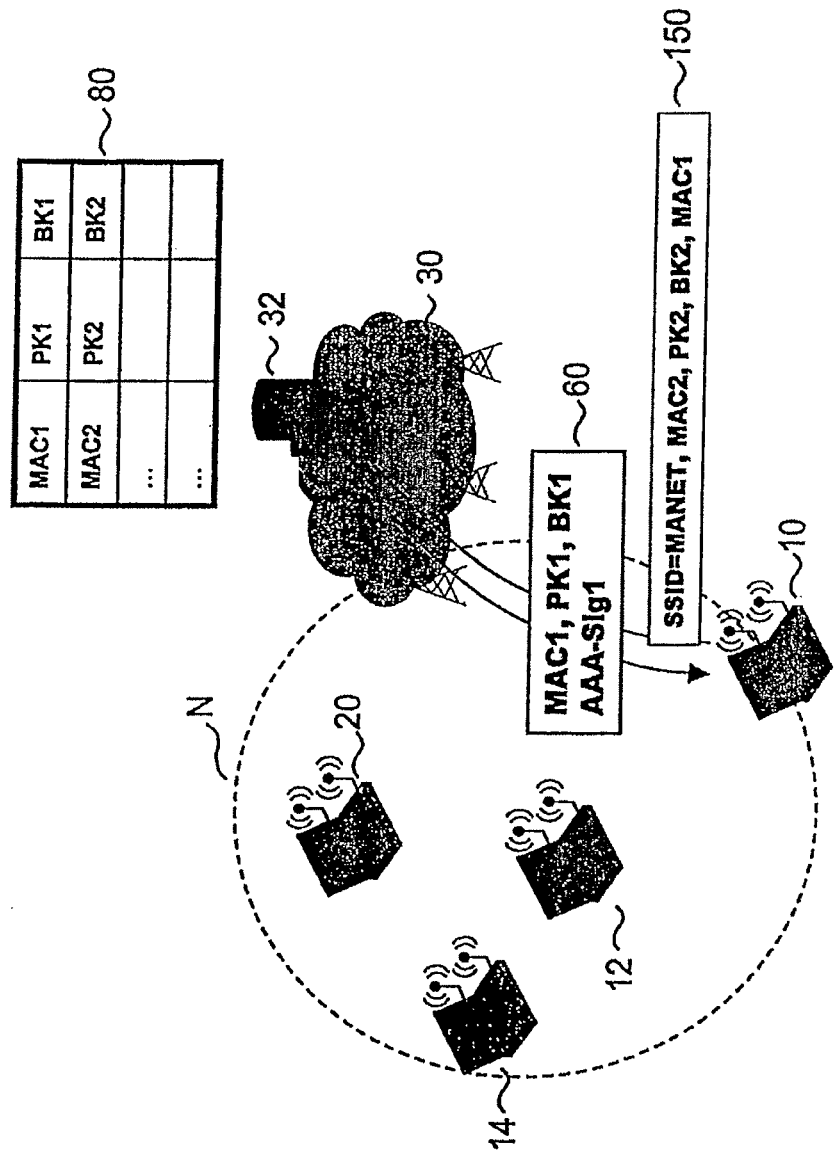
Figure 10:
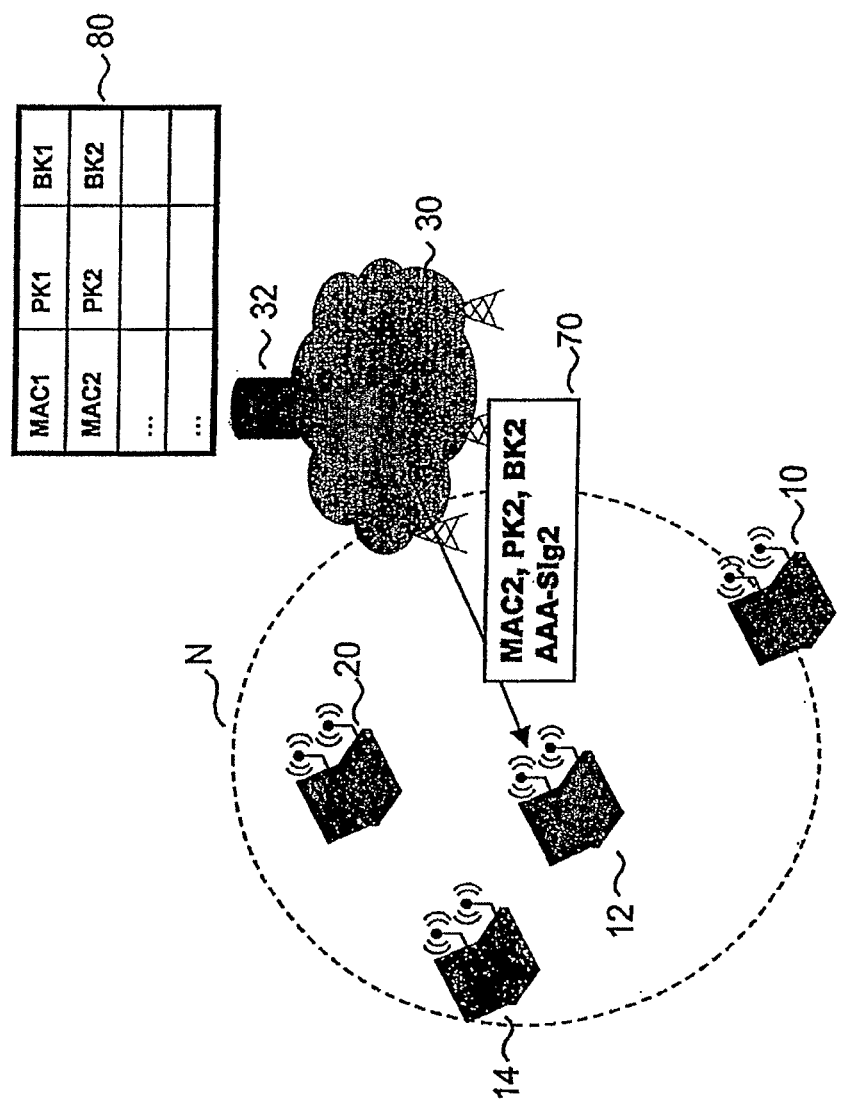

FIG. 6 describes the procedure to propagate the security relationship created for a new terminal, according to the arrangement described herein;

FIG. 7 shows an example alternative to the PEAPv2 for the creation of the security relationship of a terminal;

FIG. 8 presents, as further scenario of application of the technique described, an ad-hoc network completely connected to a 3G network;

FIG. 9 describes one of the possible ways, according to the technique described herein, through which the network intervenes in the set-up of the ad-hoc network; and FIG. 10 describes the creation of a security relationship for the scenario of FIG. 9.

DETAILED DESCRIPTION OF PREFERRED EMBODIMENTS OF THE INVENTION

The detailed description appearing herein relates to an exemplary arrangement for carrying out authentication and establishing peer-to-peer security associations in a heterogeneous Mobile Ad-hoc Network, i.e., a hybrid ad-hoc/infrastructure network.

More specifically, the exemplary arrangement described herein creates a security relationship in a hybrid network N on which the infrastructure network has control functions.

Figure 1:
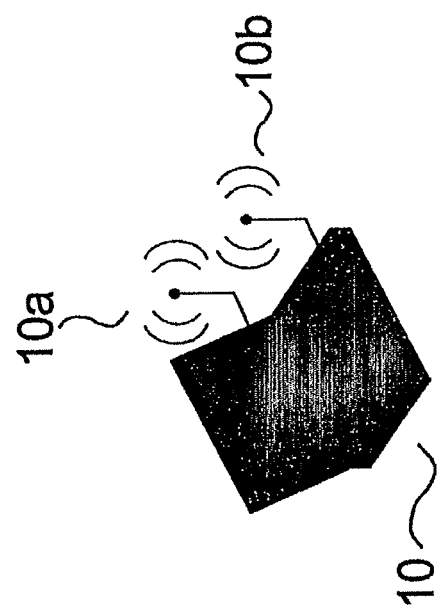

An exemplary embodiment of a terminal that belong to such a hybrid network N is represented in FIG. 1.

Specifically, FIG. 1 refers, by way of example, to the mobile terminal that will be designated 10 in the rest of the description. The terminal 10 indicates a terminal provided with a first interface 10a, such as a mobile-radio interface, and a second interface 10b, such as a Wireless LAN (WLAN) interface.

In the general context of application to which said technique refers, and the elements involved are highlighted, namely, an ad-hoc network N comprising terminals 12, 14, and 20 and intended to be accessed by a "new" mobile terminal 10. The network N has associated an external network with infrastructure, in this case a mobile-radio network 30. At least one terminal/node 20 of the network N (e.g. a Mobile Ad-hoc NETwork) performs a gateway function between the Mobile Ad-hoc NETwork N and the external network 30.

Figure 2:
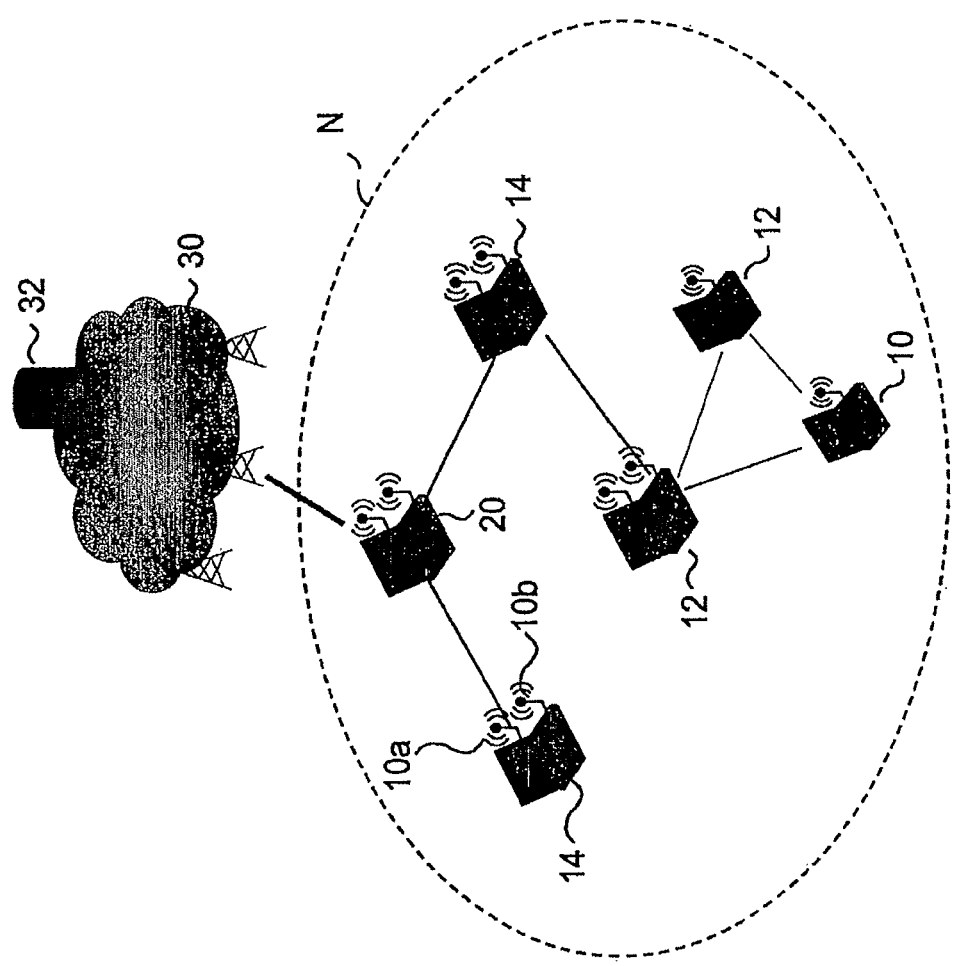

Reference network scenario is described in FIG. 2 including a plurality of terminals 10, 12, 14, and 20. The different reference numerals being intended to better highlight the different roles played by such terminals in the process better detailed in the following.

In the example shown, the terminals 10, 12, 14 and 20 may be of two types: some are equipped with a single interface such as a Wireless LAN technology interface (10b in the exemplary arrangement shown in FIG. 1); other terminals, instead, are "dual mode" terminals, in that they are equipped, in addition to a WLAN interface, also with another interface based on a technology other than Wireless LAN, for example a Third-Generation (3G) mobile radio interface, or else a LAN IEEE 802.3 (Ethernet) interface, etc.

In other words these "dual-mode" terminals adopt the arrangement shown in FIG. 1 and can are connect with other terminals, e.g. by means of a 3G mobile radio interface, or to an infrastructure network, for example a network of an Internet Service Provider or the mobile-radio network, by means of a WLAN interface (in this sense, the network is referred to as hybrid).

In the case where the infrastructure network is the mobile-radio network 30, it will be generally assumed that the terminals in question, can access a Subscriber Identity Module (SIM) card, for example via a connected SIM-reader.

The fact that certain terminals 10, 12, 14, and 20 are multi-mode, i.e., provided with a number of network interfaces, enables, in fact, one or more scenarios, in which the Wireless LAN radio interface is used for local data exchange between the terminals, and the other interface is used for purposes of control on the terminals, as well as for data transport to the infrastructure network.

The terminals provided only with a Wireless LAN interface, which belong to the Mobile Ad-hoc NETwork, must in any case be authenticated and authorized.

The problem considered herein relates to a user, equipped with a mobile terminal 10, not necessarily dual-mode, which wishes to join the network N (herein represented by a Mobile Ad-hoc NETwork) which already includes a set of terminals 12, 14, and 20. The terminal 10 obtains access to the Mobile Ad-hoc NETwork N as a result of successful authentication procedure carried out with an infrastructure network 30. This may occur either by connecting up to the infrastructure network exploiting other terminals that are already authenticated, or alternatively, directly with the infrastructure network 30 if the terminal 10 is able to connect up to the infrastructure network 30.

The former case may apply e.g. to a "single-mode" mobile terminal 10 provided only with a WLAN interface, or a "dual-mode" terminal 10 temporarily out of 3G coverage. The latter case may apply to a "dual-mode" terminal 10 with 3G coverage permitting direct access to the infrastructure network 30.

With the technique described herein, after the authentication process is successfully performed, an appropriate set of ciphering keys is created, for that particular terminal. This set is then propagated to the entire Mobile Ad-hoc NETwork N, in a secure way, e.g. by means of the routing messages. In this way, all the terminals, which are members of the Mobile Ad-hoc NETwork N, are aware of the presence of the new terminal 10, and have available the information concerning the successful outcome of the authentication procedure.

Hence, the new terminal 10 does not need to prove its authenticity each time it encounters them, i.e. it is in their transmission range as a result of its displacements. In the same way, along with the routing messages, are also propagated the ciphering keys of the terminals already belonging to the Mobile Ad-hoc NETwork. Using these keys the accessing terminal 10 is able to decipher the routing information transmitted in broadcast mode by the terminals 12, 14 and 20 already belonging to the Mobile Ad-hoc NETwork N, in order to join the routing process.

In the technique described, each mobile terminal performs a dual function, according to whether it has already been authenticated or not by the Mobile Ad-hoc NETwork through the infrastructure network. If it has not yet been authenticated, all of its traffic, excluding that related with authentication, will be blocked by the nodes in the immediate vicinity, i.e., the ones in its transmission range. The terminal will have to request access to the network N directly through the infrastructure network 30 or through another terminal 12 already included in the network N. In the latter case, the terminal 12 processes the request of the terminal 10 and forwards it to the infrastructure network 30. This guarantees the ad-hoc network a first level of security in regard to terminals that are not authorized for access since they are not authenticated successfully.

A second level of security is obtained through the creation of cryptographic material for each terminal of the ad-hoc network, which consists of one Public Key, referred to as PK and of one per-user Broadcast Key, used by the routing process and herein referred to BK.

The cryptographic material is linked to the mobile terminal/user and consequently consists in a triplet of the type (Medium Access Control Address, Public Key, Broadcast Key), hereinafter summed up as (MAC, PK, BK). The Address contained in the triplet may be the terminal Link Level address, for example, the Medium Access Control (MAC) address of IEEE 802.11.

With the technique described herein, each node can autonomously and dynamically generate the pair of public/private keys (or, if, for example, the second interface is a mobile-radio interface, said pair may have been stored in the SIM).

In the case where the mobile terminal 10 is authenticated by accessing the infrastructure network 30 via another terminal 12 already belonging to the network N, the terminal 10 that must be authenticated senses the presence of the Mobile Ad-hoc NETwork N, for example by means of a beacon from one or more nodes thereof. The terminals already belonging to the Mobile Ad-hoc NETwork N do not possess any information on the "new" terminal 10 and, consequently, "block" the traffic coming therefrom. Thus, in this discovery step, the new terminal 10 chooses a terminal 12 belonging to the Mobile Ad-hoc NETwork N that can forward its request for authentication on to the infrastructure network 30. This second terminal 12 is the "server terminal".

During the authentication stage, the first terminal 10 transmits, through the second server terminal 12, to a functional entity of the infrastructure network 30, for example to an Authentication, Authorization, and Accounting server (32 in FIG. 3), the Public Key (PK), the Broadcast Key (BK), both of which are generated autonomously, and its Link Level address (for example, the Medium Access Control Address). The server 32 stores the Public Key and Broadcast Key according to the address of the terminal and the credentials used for authentication, for example, the username or the International Mobile Subscriber Identity (IMSI). The authentication server transmits the security relationship (MAC-PK-BK) of the server terminal to the new terminal after signing it using its own Private Key.

At this point the terminal 10 and the network N are mutually authenticated.

With the procedure described, at the end of the authentication, the "new" terminal 10 possesses:

the Public Key of the server terminal;

the Broadcast Key of the server terminal, with which it is possible to decipher the routing messages transmitted thereby;

the Link-Level address of the server terminal, which will be unblocked on the new terminal, in such a way as to be able to receive the routing messages.

In a similar way, the server terminal 12 receives from the authentication server 32 in the infrastructure network 30 the security relationship (MAC, PK, BK) of the "new" terminal 10 digitally signed by the authentication server 32.

After the authentication is successfully complete the terminal/node 10 can send and receive data traffic (e.g. DHCP packets and IP packets) and is authorized to connect up to the Mobile Ad-hoc NETwork.

The authentication of the new terminal 10 is propagated to the other nodes using the routing protocol running in the Mobile Ad-hoc NETwork.

For that purpose the server terminal 12 propagates:

i) to the other nodes of the network N, the security relationship of the new terminal signed by the Authentication, Authorization, and Accounting server 32. This may be included in the topology update messages that are broadcast, after they have been encrypted with the Broadcast Key of the server terminal. It is assumed herein that the routing protocol is of a link-state type: each node possesses, at every instant, the topological "map" of the Mobile Ad-hoc NETwork and periodically spreads the information regarding its own neighbours and the changes of topology. In this way, all the other terminals are aware of the fact that a new node is added to the Mobile Ad-hoc NETwork. Furthermore, they can verify the integrity and authenticity of the security relationship (MAC, BK, PK) associated to that new node by means of the digital signature affixed by the authentication server. By including the Link Layer address of the new terminal in the security relationship, each terminal of the Mobile Ad-hoc NETwork can "unblock" that particular address upon reception of the routing messages;

ii) to the new terminal, the security relationships of the other nodes of the Mobile Ad-hoc NETwork, signed by the Authentication, Authorization, and Accounting server. In this way the new terminal can authenticate in turn, in an "implicit" way, the terminals that already belong the Mobile Ad-hoc NETwork, and can unblock for each of them their Link Level address. In this way, the new terminal knows of each node: the Broadcast Key, with which the routing messages are to be deciphered and the Public Key with which it is possible to derive, if necessary, more Application Level Keys.

Once each terminal has received the routing messages, it verifies the authenticity and integrity of the security relationships received, prior to propagating them to the other terminals. The routing messages are encrypted each time with the Broadcast Key of the node that propagates said security relationships.

Once the stage of propagation is completed, the node just authenticated has no need to repeat the aforesaid authentication procedure with all the other nodes of the Mobile Ad-hoc NETwork since the positive result of the authentication is propagated by the server terminal to the entire Mobile Ad-hoc NETwork in a secure way. In fact, with the "entry" of the new node within the routing process of the nodes, of the Mobile Ad-hoc NETwork, these receive confirmation that the node has been authenticated successfully. In the same way, if any member node of the Mobile Ad-hoc NETwork, following upon a displacement, were directly connected to the new terminal, it would not need to be authenticated therewith, since the new node possesses the security relationship (MAC-PK-BK) of the each terminal, as if said node had directly authenticated it.

A Public-Key encoding technique is used for the purpose of enabling, for each pair of terminals of the Mobile Ad-hoc NETwork, negotiation of other per-user per-session encryption keys.

A re-authentication procedure is executed periodically by each node of the Mobile Ad-hoc NETwork. The updating of the Broadcast Keys is managed simultaneously with this re-authentication procedure. For this purpose, the re-authentication procedure can be activated with the initial server terminal, here designated by the term Main Server, or, if this were no longer available, by any other terminal of the Mobile Ad-hoc NETwork, here designated by the term Back-up Server. All the terminals authenticated by the Authentication, Authorization, and Accounting server are potential servers. At the end of the re-authentication procedure, the Authentication, Authorization, and Accounting server signs, with its Private Key, the new security relationship and transmits it to the server, which propagates it along with the routing messages, according to what has been described previously.

An exception may arise in the case of terminals that have a direct connection with the infrastructure network so that the updating of the security relationship occurs simultaneously with the re-authentication procedure therewith. In this case, the new security relationship signed by the Authentication, Authorization, and Accounting server is propagated directly by the terminal itself.

With this method, the Mobile Ad-hoc NETwork is protected from the presence of any "malignant" node, which has been authenticated with the infrastructure network with the sole purpose of actuating security attack on the other terminals. With the method described, these type of attacks are prevented, since, if a terminal of the Mobile Ad-hoc NETwork modifies a security relationship (MAC, PK, BK), it is not then able to sign it because it does not possess the Private Key of the authentication server. On the other hand, for the reasons mentioned previously, a terminal considers valid only those security relationships signed by the authentication server; all the others are rejected.

In the currently preferred embodiment, the access procedure of the "new" terminal 10 is based upon the 802.1x access control architecture: each terminal involved runs both in Supplicant and Authenticator mode.

Figure 3:
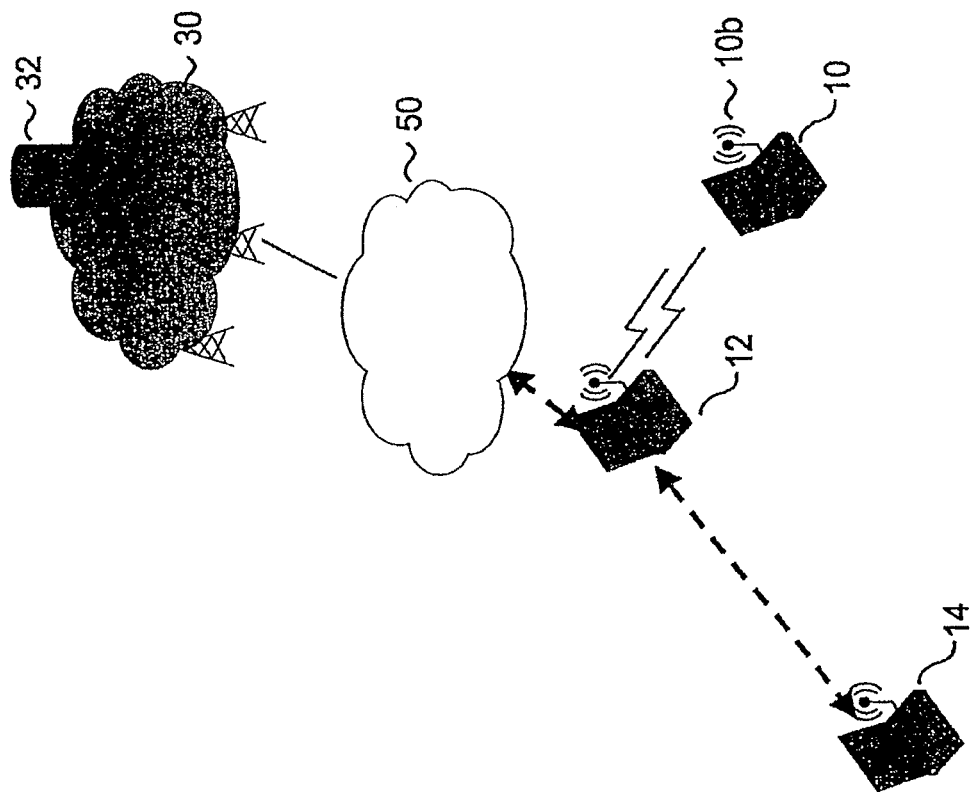
FIG. 3 shows an example of application of the arrangement described herein.

More specifically, in the scenario illustrated in FIG. 3, the terminal 10 that intends to join the network possesses a single interface IEEE 802.11 10b. This terminal 10 also possesses a SIM-card, where the credentials for authentication with the mobile-radio (infrastructure) network 30 are stored, and a device for reading them (a SIM-reader). In addition, the terminals implement an Extensible Authentication Protocol method for authentication. A preferred embodiment resorts to the solution that uses Protected Extensible Authentication Protocol (S. Josefsson, H. Anderson, G. Zorn, D. Simon, A. Palekar, "Protected EAP Protocol (PEAP)", <draft-josefsson-ppext-eap-tls-eap-07.txt>, October 2003) as method for creating a protected tunnel in the authentication stage, in conjunction with an Extensible Authentication Protocol SIM-based authentication method, such as Extensible Authentication Protocol—SIM [[RIF]] or Extensible Authentication Protocol-Authentication and Key Agreement [[RIF]], for carrying out authentication with the mobile-radio network. It is, however, possible to use any other authentication method.

The various terminals considered herein moreover include software modules that implement a routing protocol of a link-state type, for example Optimized Link State Routing (T. Clausen, P. Jacquet, "Optimized Link State Routing Protocol (OLSR)", rfc3626, October 2003).

The mobile-radio infrastructure network 30, co-operates with the terminal 12 via a network, here designated 50, that may in fact correspond to the network N and includes the "gateway" terminal 20, connected to the mobile network 30 having activated a context for access to the IP services.

The gateway 20 has thus already been authenticated and possesses two valid IP addresses: one belonging to the mobile-radio network 30, the other valid on the 802.11b local-network interface used in the network 50. This does not exclude, however, the possibility that in the Mobile Ad-hoc NETwork 50 there exist other dual-mode devices or terminals with gateway function.

The authentication of the terminal 20 is executed directly with the mobile-radio network 30 using an authentication method, which does not form subject matter of the present invention, which can be, for example, the authentication procedure and negotiation of the Security Key provided in Universal Mobile Telecommunications System (UMTS), known by the name of Authentication and Key Agreement (AKA).

When the terminal 20 decides to form e.g. a Mobile Ad-hoc NETwork N, it creates, via the mobile-radio network 30 (specifically with an Authentication, Authorization, and Accounting server 32), its security relationship through the exchange of signalling messages, transmitting its Public Key (PK1), its Broadcast Key (BK1), its Medium Access Control Address (MAC1), and the Service Set Identifier (SSID) of the Mobile Ad-hoc NETwork N, chosen autonomously by the terminal 20 itself. In this way, the Authentication, Authorization, and Accounting server 32 inserts the terminal 20 in the list of the nodes forming part of the Mobile Ad-hoc NETwork N, identified by the Service Set Identifier, storing the corresponding relationship. Finally, the server 32 digitally signs said relationship with its own Private Key and transmits it to the terminal 20, together with its own Public Key. The terminal 20 inserts its security relationship, signed by the server, in the routing table. The Public Key of the server will be useful to the terminal 20 for verifying the authenticity of the security relationships propagated through the routing protocol and referred to other terminals, on the basis of what is described hereinafter.

A new mobile terminal, for example 10, is in the transmission range of the terminal 12 and consequently detects the presence of a Mobile Ad-hoc NETwork 50, thanks to the IEEE 802.11b Beacon messages transmitted by the terminal 12, from which it obtains the network identifier (for example, Service Set Identifier "manet"). The Beacon signals can be received by the terminal 10, because they are transmitted in clear mode.

Instead, in order to protect the Mobile Ad-hoc NETwork from DoS (Denial Of Service) attacks, the routing messages are transmitted in broadcast mode only after being ciphered.

A condition for the terminal 10 to be able to join the Mobile Ad-hoc NETwork N is to be authenticated by all the terminals that already form part of the Mobile Ad-hoc NETwork N.

The purpose of the technique described is thus to enable the terminal 10 to join the Mobile Ad-hoc NETwork N by carrying out a single authentication procedure whose outcome, if positive, is propagated in a secure way to all the other members of the ad-hoc network N, together with the security relationship established for that terminal with the authentication.

For authentication of the terminal 10, the IEEE 802.1x access-control technique is used. In this way, the terminal 10 is not granted access to the Mobile Ad-hoc NETwork N, if it is not first authenticated successfully and much less is able to decipher the routing messages transmitted in broadcast mode.

The terminal 10 starts the 802.1x authentication procedure exploiting the terminal 12, which thus has the function of Authenticator. The 802.1x frames are transmitted within the 802.11 data frame through the Uncontrolled Port of the Authenticator 12 (the terminal 10 is in the associated-non-authenticated state).

In the example considered, the Authenticator (terminal) 12 reaches the 3G network 30 via the network 50. In this case, the Authenticator 12 knows, through the routing protocol, the terminal 20 that, in the network 50, functions as gateway with the 3G network 30, to which the Authenticator 12 will forward the authentication packets through the multi-hop network. Transmission through the multi-hop network, during the authentication stage, of the authentication messages, which carry Public Keys, Broadcast Keys and the credentials of the user, is secure if there is assumed as requirement the use of a protected authentication method, such as, for example, one of the "tunneled" Extensible Authentication Protocol methods. One example may be the Protected Extensible Authentication Protocol, jointly with an authentication method of the SIM-based user, for example, Extensible Authentication Protocol—SIM or Extensible Authentication Protocol-Authentication and Key Agreement. The use of other methods does not imply, however, correct operation of the technique described. The preferred embodiment uses Protected Extensible Authentication Protocol.

Alternative embodiments may provide for direct access of the authentication terminal 12 to the infrastructure network 30. In that case the authentication terminal 12 will be configured to incorporate the functions of the gateway 20.

Whatever the arrangement adopted, as a FIRST STEP, the terminal 10 authenticates itself versus the network (Authentication, Authorization, and Accounting server 32) and creates a cryptographically protected tunnel through the Protected Extensible Authentication Protocol. Other Extensible Authentication Protocol methods can be used for this purpose. Protecting the authentication a cryptographic tunnel is advantageous since, in order to carry out the authentication with the 3G network 30, the new terminal 10 must transmit its credentials of the user. These credentials (and other sensitive information) are highly likely to traverse other nodes of the network 50 and hence, cannot be transmitted in clear mode.

The 3G server 32 and the terminal 10 execute a Transport Layer Security (TLS) Handshake, through which the terminal 10 can authenticate the network, verifying the validity of the digital certificate presented to it by the server 32. In the certificate there is contained the public key of the server, with which:

the server 32 and the new terminal 10 negotiate the keys with which the subsequent Extensible Authentication Protocol packets are encrypted;

each terminal that is already a member of the Mobile Ad-hoc NETwork N will be able to verify the validity/authenticity of the security relationship established for a new node added to the Mobile Ad-hoc NETwork N, propagated with the routing broadcast messages through the multi-hop network and signed by the Authentication, Authorization, and Accounting server (see the EIGHTH STEP described in the following).

As a SECOND STEP, the 3G network 30 authenticates the terminal 10, using for example a SIM-based authentication method, such as Extensible Authentication Protocol—SIM or Extensible Authentication Protocol-Authentication and Key Agreement, or another method in the case where the user does not possess the SIM card.

Figure 4:
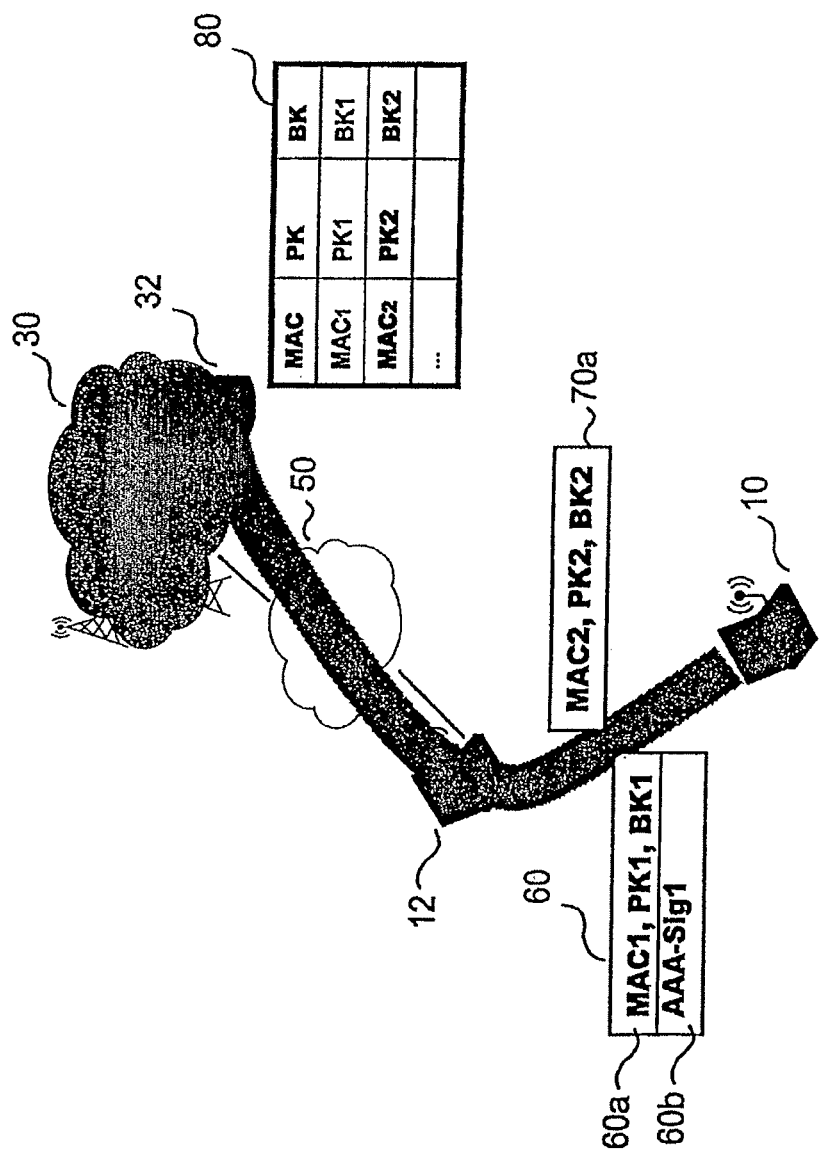
FIG. 4 shows the exchange of security relationships, according to the arrangement described herein, during the stage of authentication of a new terminal.

As a THIRD STEP, the terminal 10 and the 3G network 30 complete the PEAP, executing the Cryptographic Binding step. Then, they exchange the security relationships, According to the sequence of operation shown in FIG. 4 and described in what follows:

The 3G network 30 transmits, to the terminal 10, a security relationship 60 that includes:
the (MAC1, PK1, BK1) triplet 60a of the Authenticator 12,
the digital signature 60b of Authentication, Authorization, and Accounting server 32 (AAA-Sig1).

The server 32 possesses this relationship in so far as it is transmitted thereto by the Authenticator 12 at the moment of its authentication. The security relationship 60 is transmitted, for example, in a Extensible Authentication Protocol—Type-Length-Value packet or else in a "Vendor Specific" packet, together with the other attributes necessary for cryptographic binding.

The terminal 10 transmits, in response to the 3G network 30, its own security relationship 70a that includes:
its own Medium Access Control Address (MAC2)
its own Public Key (PK2)
its own Broadcast Key (BK2)

This enables the authentication server 32 to enter the new terminal 10 in a list 80 of the nodes belonging to the specific Mobile Ad-hoc NETwork N and to store the security relationship associated thereto. The nodes of the Mobile Ad-hoc NETwork N adopt the same encoding algorithm so that each terminal can generate a Broadcast Key that is correct in terms of length for the particular algorithm.

As a FOURTH STEP, the Authentication, Authorization and Accounting server 32 and the terminal 10 tear down the Protected Extensible Authentication Protocol tunnel.

As a FIFTH STEP (FIG. 5), if the authentication step has had a positive result, the server 32 transmits to the Authenticator 12, along with the Authentication, Authorization, and Accounting Success packet:

i) the PMK (Pair-wise Master Key) from which the encryption key (Temporal Key), used by IEEE 802.11 encryption algorithms to encrypting traffic between the terminal 10 and the Authenticator 12, are obtained;

ii) a security relationship 70a, obtained from the terminal 10 during the authentication step, which includes: (MAC2, PK2, BK2) and a digital signature (AAA-Sig2) 70b of Authentication, Authorization and Accounting server 32. The items of information 70a and 70b are jointly indicated 70.

The items of information i) and ii) are transmitted after being encrypted by means of the secret shared between the terminal 12 and the Authentication, Authorization, and Accounting server 32. The terminal 10 is now in the associated-authenticated state.

Figure 5:
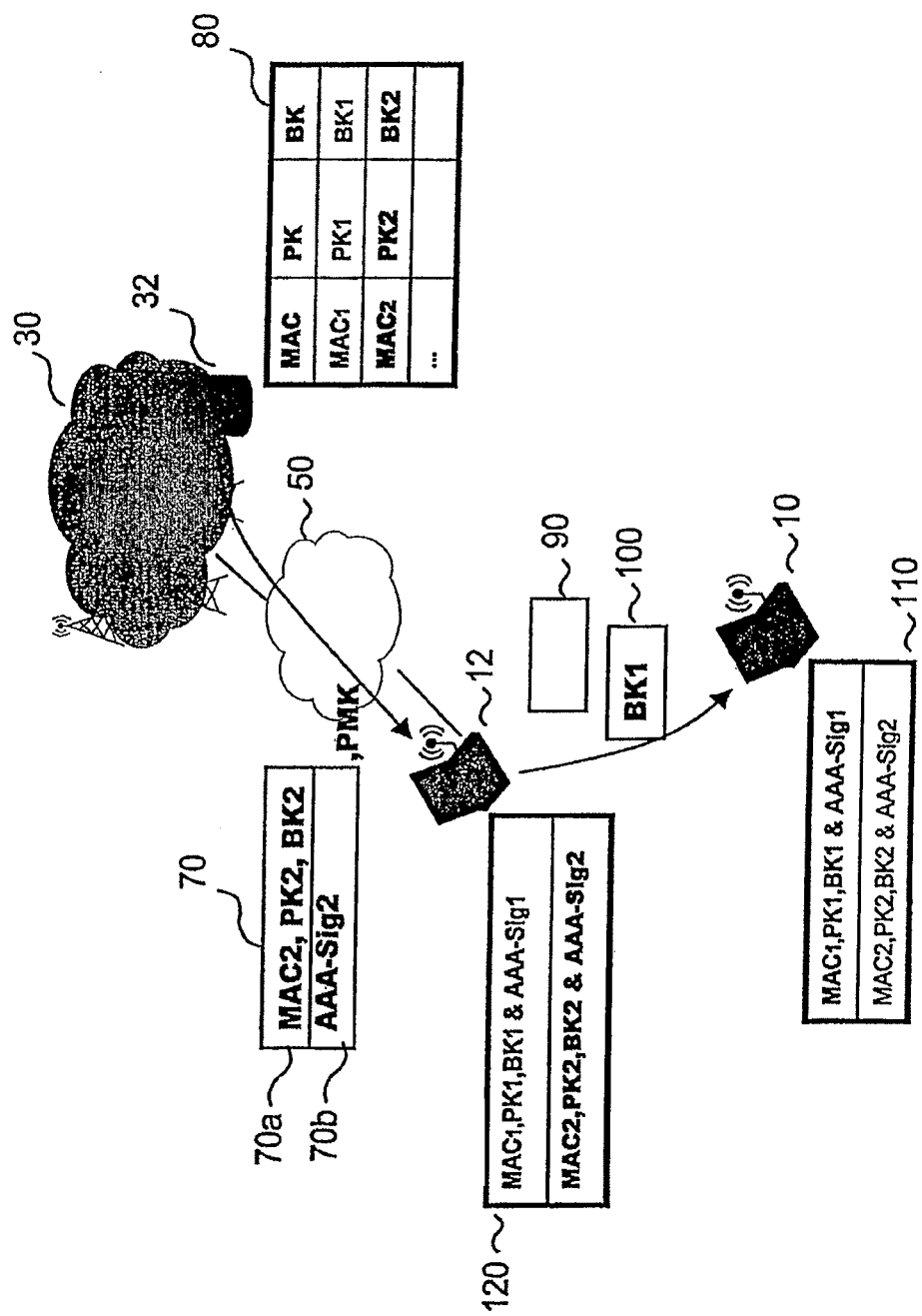
FIG. 5 shows the transmission of a security relationship established for a mobile terminal that has just been authenticated, according to the arrangement described herein.

As a SIXTH STEP, in accordance with what is illustrated in FIG. 5, the Authenticator 12 transmits to the terminal 10 an Extensible Authentication Protocol Over Local Area Network-Key 90 packet by means of which:

it confirms the existence of a session key (Temporal Key) used between the two for IEEE 802.11 encrypting;
it transmits its own Broadcast Key BK1 100, appropriately encrypted.

As a SEVENTH STEP, the Authenticator 12 opens the 802.1x port, which is thus set in the Authorized state for the terminal 10.

As a EIGHTH STEP, the terminal 12, which has operated as Authenticator, informs all the other nodes of the Mobile Ad-hoc NETwork N of the presence of the new terminal 10, through the routing messages of the "Topology Update" type (e.g. the Topology Control messages of the OLSR protocol). For this purpose, the Authenticator 12 executes the steps outlined below.

It enters, in an internal table 120, the security relationship 70 (MAC2, PK2, BK2, AAA-Sig2) obtained through the last Authentication, Authorization, and Accounting packet.

It also activates a Re-Authentication Timer. The value of this Timer establishes the interval of time in which it is possible to consider the credentials (hence all the cryptographic material) of the terminal 10 valid. Upon expiry of this interval, terminal, which at that moment is responsible for carrying out relaying of the traffic of the terminal 10, sends to the terminal 10 a re-authentication request.

It appends, in the routing messages, the security relationship 70 (MAC2, PK2, BK2, AAA-Sig2) of the new terminal 10. In addition to the information used for updating the topology of the network, it enters also the security relationships, once again signed by the server, which it has stored for the other nodes of the Mobile Ad-hoc NETwork N.

Finally, it transmits in broadcast mode the routing messages, after having encrypted them with its own Broadcast Key BK1 100. The terminal 10, after receiving its own security relationship with the routing message, verifies the integrity thereof and enters the relationship signed by the Authentication, Authorization, and Accounting server 32 in its routing table 110.

As may be seen from FIG. 6, a terminal that already formed part of the ad-hoc network, for example the terminal 14, when receiving the routing messages, behaves as described in what follows.

It decrypts the routing message using the key BK1 100 that it possesses in its table 120.

It verifies the authenticity of the security relationship 70 (MAC2, PK2, BK2, AAA-Sig2) received from the terminal 10 through the digital signature affixed by the Authentication, Authorization, and Accounting server 32. If the verification is successful, the terminal 14 can conclude that the relationship has not been altered. If the verification yields a negative result, the terminal 14 concludes that the relationship has been altered and rejects it. For this reason the signature guarantees, on the one hand, the integrity of the relationship and, on the other hand, the identity of the server 32.

Additionally, the terminal 14 updates the table 140, by entering, if valid, the security relationship 70 (MAC2, PK2, BK2, AAA-Sig2) of the terminal 10.

The 802.1x port on terminal 14 is "forced" into the Authorized state for MAC2.

It also activates the Re-Authentication Timer for the terminal 10.

It further copies, in the routing message, the security relationship 70 (MAC2, PK2, BK2, AAA-Sig2) of the new terminal 10 and inserts the security relationships of the nodes that it maintains. The routing message is this time encrypted with its own Broadcast Key (BK4) 130 and is propagated in broadcast mode.

Another new terminal 10' which has not yet been authenticated and which hence does not form part of the ad-hoc network N can receive the broadcast routing messages but is not able to decode them since it does not possess the Broadcast Key 100 (see FIG. 6), for example, BK1.

At the end, each node of the Mobile Ad-hoc NETwork N in the transmission range of the terminal 10 is able to receive the broadcast messages transmitted by the terminal 10 and to decrypt them with the corresponding key BK2.

It should be noted that operation of the arrangement is not strictly linked to the use of the Protected Extensible Authentication Protocol as the method for transporting the Public and Broadcast Keys during the authentication stage.

As an alternative solution, the authentication server 32 of the 3G network 30 and the terminal that is to be authenticated (in the example, the terminal 10) may obtain the public key PK2 and the Broadcast Key BK2 in a dynamic and independent way (i.e., using the same algorithm), during the authentication stage, in the same way with which the MSK (Master Session Key) is calculated. With this alternative, the procedure of authentication of a new terminal 10 can be carried out using any Extensible Authentication Protocol method that supports the dynamic generation of the encoding keys and mutual authentication.

With reference to FIG. 7, at the end of the mutual authentication, the Authentication, Authorization, and Accounting server 32 in a step 200 transmits to the Authenticator 12, the security relationship 70, simultaneously with transmission of the PMK, designated 145. In this case, unlike the preceding procedure, the server 32 has derived the security relationship independently of the terminal 10.

The Authenticator 12, instead, in a step 202 transmits to the terminal 10 its security relationship 60 (MAC1, PK1, BK1, AAA-Sig1), in the EAPOL-Key message simultaneously with the negotiation of the Session Key.

At this point, the Authenticator 12 opens, in a step 204, the 802.11x port, which is then set in the Authorized state for the terminal 10.

Hereinafter, the technique continues from the EIGHTH STEP considered in the foregoing.

Once again with reference to the example presented in FIG. 3, the terminal 12 has operated as Authenticator for the procedure of authentication of the new terminal 10. It should be noted that all the terminals of the ad-hoc network that have already been authenticated are potential Authenticators for any node that needs to be authenticated or re-authenticated, i.e., they can be regarded as back-up Authenticators.

According to what was described previously, following upon the procedure for authentication of the terminal 10, the 802.1x port on the Authenticator 12 is in the Authorized state for the terminal 10; the 802.1x ports of the other terminals (again for terminal 10) have been forced into the Authorized state during the stage of propagation via the routing protocol.

Simultaneously, on the Authenticator 12 there is initialized the Re-authentication Timer, upon expiration of which the Authenticator 12 forces the mobile terminal 10 to execute the re-authentication procedure and to update the encoding keys. What has been described applies also to the other terminals of the Mobile Ad-hoc NETwork N, which, according to what has been said, operate as back-up Authenticators for the terminal 10; i.e., the security relationship established for the terminal 10 and propagated with the routing messages, initializes the Re-authentication Timer on each of them. Taking into account the propagation times of the routing messages, the Timer will expire, with a high degree of likelihood, on the main Authenticator (terminal 12).

Upon expiration of the Re-authentication Timer, the following cases may arise:

i) The main Authenticator 12 still forms part of the Mobile Ad-hoc NETwork N and is in the same range of coverage as the terminal 10; i.e., it is directly reachable.

ii) The main Authenticator 12 still forms part of the Mobile Ad-hoc NETwork N but is no longer in the range of coverage of the terminal 10, for example on account of the mobility of the terminals.

iii) The main Authenticator 12 no longer forms part of the Mobile Ad-hoc NETwork N because it has moved or else has become inactive (exhaustion of the energy resources or crash of the terminal).

In case i), re-authentication will be performed with the main Authenticator; upon expiration of the Re-authentication Timer, the main Authenticator 12 asks the terminal 10 for transmission of its identity, forcing it to authenticate again. In concomitance with the re-authentication procedure, which is usually shorter than the full authentication procedure, updating of the encoding keys is carried out. The terminal 10 generates a new value for its Broadcast Key and transmits it to the Authentication, Authorization and Accounting server 32. This updates the security relationship of the terminal 10 (which is different only for the Broadcast Key) and, after signing it, transmits it to the main Authenticator (terminal) 12 according to what has been described previously. At the end of authentication, the two terminals 12 and 10 also renew the session key, which is used for encoding the unicast traffic. The main Authenticator 12 then propagates the new security relationship to the overall Mobile Ad-hoc NETwork N through the routing messages.

While performing the re-authentication procedure with the main Authenticator 12 the following possibilities may arise:

if the Re-Authentication Timer in the back-up Authenticator (i.e. all the other terminals) has not expired yet, then, when they receive the routing messages, they update the new keys (security relationships) and re-initialize the Re-Authentication timer;

if the Re-Authentication Timer has expired only on some or all of the back-up Authenticators, then, in the back-up Authenticator for which the timer has expired, the 802.1x port is forced into the Unauthorized state for that particular terminal, since the terminal 10 is engaged already with the re-authentication and hence cannot execute more than one at the same time. However, as soon as these back-up Authenticators receive updating of the security relationship, the 802.1x port returns to the Authorized state for that particular terminal, and the Re-Authentication Timer is reset.

In cases ii) and iii) re-authentication is performed using one of the directly connected terminals as Backup Authenticators. Since all the terminals of the Mobile Ad-hoc NETwork are back-up Authenticators from the standpoint of the terminal 10, everything proceeds as described above. This is possible because, irrespective of the Authenticator used for executing the re-authentication, the authentication messages will in any case be forwarded towards the same Authentication, Authorization, and Accounting server.

The departure of a mobile terminal from the Mobile Ad-hoc NETwork N is managed through the routing protocol. For example, a mobile node which for a certain period does not transmit "Topology Update" messages is no longer considered to be a member of the Mobile Ad-hoc NETwork N and is thus cancelled from the routing tables, together with the corresponding security relationship. For this purpose it is necessary, however, to inform the Authentication, Authorization, and Accounting server 32 so that also this can remove the terminal from the list of the nodes forming part of the Mobile Ad-Hoc NETwork N. In this case, the gateway node 20 transmits to the Authentication, Authorization, and Accounting server 32 the Medium Access Control Address of the terminal in question. Alternatively, a mobile terminal, before abandoning the Mobile Ad-hoc NETwork N, can transmit to the network (Authentication, Authorization, and Accounting server) a Logoff message, exploiting one of the Authenticator present in the Mobile Ad-hoc NETwork.

An alternative embodiment of the technique described herein is the one shown in FIG. 8. In that case the mobile terminals 10, 12, 14, and 20, that form part of the ad-hoc network N or that want to join it, are all dual-mode and all in the range of coverage of the 3G network 30. Also in this case, the terminals support IEEE 802.1x and hence functions both as Supplicant and Authenticator.

Each terminal exploits the 3G network 30 to carry out the authentication and to receive the information necessary for establishing a (secure) communication with the other nodes of the Mobile Ad-hoc NETwork N.

As in the previous case, the 3G network 30 intervenes in the set-up of the Mobile Ad-hoc NETwork N, identified by the SSID, keeping the public key and the Broadcast Key of each terminal stored according to a unique identifier belonging to the terminal itself, e.g., the Medium Access Control Address.

With reference to FIG. 9, the technique is the following.

As a FIRST STEP, the new terminal, for example the terminal 10, identifies the presence of an ad-hoc network N, through the Beacon messages, which it receives, for example from the terminal 12, and from which it obtains the network identifier (for example SSID="manet"). The terminal 10 cannot decipher the routing messages and much less forward traffic towards any of the nodes of the Mobile Ad-hoc NETwork N because, on account of the 802.1x access control, it would be blocked.

As a SECOND STEP, the terminal 10 carries out authentication with the 3G network 30, for example, through the authentication procedure and negotiation of the Security Key provided in Universal Mobile Telecommunications System (UMTS), known by the name of Authentication and Key Agreement (AKA).

At this point, the 3G network 30 intervenes in the set-up of the Mobile Ad-hoc NETwork N, through the exchange with the terminal 10 of the information necessary to the network, for entering said terminal into the list of the member nodes of the Mobile Ad-hoc NETwork N, and necessary to the new terminal 10, so that the latter will be able to communicate with the other nodes of the Mobile Ad-hoc NETwork N. The terminal 10 transmits to the AAA server 32 a token 150 including the SSID of the network N, the triplet MAC2, PK2, BK2 and the MAC1 address of the terminal 12.

This information is transmitted using mobile-radio network signalling messages that are hence protected on the radio link by the encoding keys generated with the 3G authentication technique, or by means of alternative signalling mechanisms.

As a THIRD STEP, the terminal 10 generates the pair of public/private keys and its own Broadcast Key. Then it transmits to the Authentication, Authorization, and Accounting server, the Service Set Identifier of the Mobile Ad-hoc NETwork that it wishes to join, its public key PK2, its Broadcast Key BK2, and its Medium Access Control Address MAC2. In this way, the Authentication, Authorization, and Accounting server can add the Medium Access Control Address of the new terminal to the list of the nodes already belonging to the Mobile Ad-hoc NETwork and store the corresponding security relationship dynamically. Alternatively, the server and the terminal could obtain the public key and the Broadcast Key independently, using the same algorithm. In this case, it would be sufficient for the new terminal to transmit just the Medium Access Control Address. The new terminal transmits to the network also the Medium Access Control address of the terminal 40 (for example, the one nearest to it), of which it wishes to obtain the security relationship.

As a FOURTH STEP, since the network possesses the associations (MACx, PKx, BKx) of each node of the Mobile Ad-hoc NETwork N, it transmits:

to the terminal 10, the security relationship of the terminal 12 (MAC1, PK1, BK1, AAA-Sig1); in addition, it transmits thereto also the Public Key of the Authentication, Authorization, and Accounting server 32 so that the terminal 10 can subsequently verify the authenticity of the security relationships propagated in the Mobile Ad-hoc NETwork through the routing messages; the 802.1x port on the terminal 10 is forced into the Authorized state for the terminal 12 (MAC1);

to a terminal of the Mobile Ad-hoc NETwork N already authenticated (for example to the terminal 12), the security relationship (MAC2, PK2, BK2, AAA-Sig2) of the new terminal that has joined the Mobile Ad-hoc NETwork (FIG. 10); this forces the 802.1x port into the Authorized state for the new MAC2.

As a FIFTH STEP, the terminal 12 propagates, by means of the routing messages, the security association of the new terminal, along with the security relationships stored for the other terminals. Upon reception of these messages on each terminal, the 802.1x port is forced into the Authorized state for the new terminal 10, permitting traffic generated by the latter.

Consequently, without prejudice to the underlying principles of the invention, the details and the embodiments may vary, also appreciably, with reference to what has been described by way of example only, without departing from the scope of the invention as defined by the annexed claims.

The invention claimed is:

1. A method for controlling access of a mobile terminal to a communication network comprising a set of terminals, wherein said mobile terminal obtains access to said network as a result of a successful authentication procedure, comprising the steps of:

configuring said network for propagating routing messages within said network;

performing said authentication procedure of said mobile terminal;

creating, as a successful outcome of said authentication procedure of said mobile terminal, a set of authentication data of said mobile terminal;

making the successful outcome of said authentication procedure of said mobile terminal known to the terminals in said set by propagating among the terminals in said set routing messages that contain said set of authentication data of said mobile terminal, whereby said mobile terminal is permitted to access said network via any of the terminals in said set based on said authentication procedure, wherein said propagating routing messages that contain said authentication data is performed by a terminal from said set of terminals after said routing messages have been encrypted using a Broadcast key of said terminal, the Broadcast key being different from a public key or private key associated with said terminal; and propagating to said mobile terminal security relationships of said terminals in said set of terminals.

2. The method of claim 1, comprising the steps of:
performing said authentication procedure of said mobile terminal via one of the terminals in said set; and
notifying the successful outcome of said authentication procedure to the other terminals in said set.

3. The method of claim 1, comprising the steps of:
providing an authentication function associated with said network, said authentication function being external to said network; and
performing said authentication procedure of said mobile terminal with said authentication function external to said network.

4. The method of claim 3, comprising the steps of:
performing said authentication procedure of said mobile terminal with said authentication function external to said network via one of the terminals in said set; and
notifying the successful outcome of said authentication procedure to the other terminals in said set.

5. The method of claim 3, comprising the steps of:
including said authentication function in an infrastructure network external to said network; and
providing said terminals in said set with one of:
a direct connection with said infrastructure network, and
an indirect connection with said infrastructure network via a multi-hop connection through said network.

6. The method of claim 5, comprising the step of configuring said infrastructure network as a mobile-radio network.

7. The method of claim 6, comprising the steps of providing at least one of said terminals with a mobile-radio interface having associated therewith a SIM-type module.

8. The method of claim 5, comprising the step of requesting from said infrastructure network, respective authentication data of said terminals in said set, once said mobile terminal is authenticated with said authentication function.

9. The method of claim 1, comprising the steps of:
providing an authentication function associated with said network;
causing said mobile terminal to generate an authentication request; and
forwarding said authentication request generated by said mobile terminal toward said authentication function associated with said network.

10. The method of claim 9, comprising the steps of configuring at least one terminal in said set as an authenticator forwarding said authentication request generated by said mobile terminal toward said authentication function associated with said network.

11. The method of claim 1, comprising the steps of configuring said network for link-state type routing of said routing messages.

12. The method of claim 1, comprising the steps of:
associating with said network an authentication function; and
including in said routing messages propagated over said network said set of authentication data of said mobile terminal signed by said authentication function.

13. The method of claim 1, comprising the steps of:
associating with said network an authentication function; and
including in said routing messages propagated over said network respective authentication data of said terminals in said set signed by said authentication function.

14. The method of claim 1, comprising the steps of:
including in said routing messages propagated over said network respective authentication data of said terminals; and
causing each of said terminals receiving said routing messages to verify the authenticity and integrity of said authentication data prior to propagating them to the other terminals.

15. The method of claim 14, comprising the steps of causing the terminals in said set receiving said routing messages to store the authentication data for said mobile terminal while authorizing traffic for said mobile terminal.

16. The method of claim 1, comprising the steps of:
broadcasting over said network respective authentication data related to said terminals in said set; and
causing said mobile terminal, once successfully authenticated, to detect said respective authentication data to establish thereby communication paths toward said terminals in said set.

17. The method of claim 1, comprising the step of communicating in a secure way within said network the successful outcome of said authentication procedure.

18. The method of claim 1, wherein the set of authentication data associated with said mobile terminal comprises ciphering keys associated with said mobile terminal.

19. The method of claim 18, comprising the steps of:
broadcasting over said network respective ciphering keys related to said terminals in said set;
causing said mobile terminal, once successfully authenticated, to detect said respective ciphering keys to establish thereby communication paths toward said terminals in said set.

20. The method of claim 18, comprising the steps of generating said ciphering keys in the form of per-user sets of ciphering keys.

21. The method of claim 18, comprising the step of dynamically generating said ciphering keys.

22. The method of claim 1, comprising the step of associating authentication data with said terminals.

23. The method of claim 22, comprising the step of associating with said authentication data a terminal medium access control address.

24. The method of claim 23, comprising the steps of selecting said terminal address a link level address or the medium access control address of IEEE 802.11.

25. The method of claim 22, comprising the step of periodically updating said authentication data associated with said terminals.

26. The method of claim 1, wherein said network is a mobile ad-hoc network.

27. A system for controlling access of a mobile terminal to a communication network comprising a set of terminals, wherein said mobile terminal obtains access to said network as a result of a successful authentication procedure, comprising:
an authentication server for performing said authentication procedure of said mobile terminal,
wherein said authentication server is also configured for creating, as a successful outcome of said authentication procedure of said mobile terminal, a set of authentication data of said mobile terminal; and
a communication mechanism configured for:
making the successful outcome of said authentication procedure of said mobile terminal known to the terminals in said set by propagating among the terminals in said set routing messages that contain said set of authentication data of said mobile terminal, whereby said mobile terminal is permitted to access said network via any of the terminals in said set based on said authentication procedure, wherein said propagating routing messages that contain said set of authentication data is performed by a terminal from said set of terminals after said routing messages have been encrypted using a Broadcast key of said terminal, the Broadcast key being different from a public key or private key associated with said terminal; and
propagating to said mobile terminal security relationships among of said terminals in said set of terminals.

28. The system of claim 27, wherein:
one of the terminals in said set is configured for supporting said mobile terminal to authenticate with said authentication server; and
said communication mechanism is capable of notifying the successful outcome of said authentication procedure to the other terminals in said set.

29. The system of claim 27, wherein the authentication server associated with said network for performing said authentication procedure of said mobile terminal is external to said network.

30. The system of claim 29, wherein:
said authentication server is capable of performing said authentication procedure of said mobile terminal via one of the terminals in said set; and
said communication mechanism is capable of notifying the successful outcome of said authentication procedure to the other terminals in said set.

31. The system of claim 29, comprising:
an infrastructure network external to said network, said infrastructure network comprising said authentication server;
said terminals in said set being equipped with one of:
a direct connection with said infrastructure network, and
an indirect connection with said infrastructure network via a multi-hop connection through said network.

32. The system of claim 31, wherein said infrastructure network is a mobile-radio network.

33. The system of claim 32, wherein at least one of said terminals is provided with a mobile-radio interface having associated therewith a SIM-type module.

34. The system of claim 31, wherein said mobile terminal, once authenticated with said authentication server, is configured for requesting from said infrastructure network respective authentication data of said terminals in said set.

35. The system of claim 27,
wherein said authentication server is associated with said network; and
wherein said communication mechanism is configured for forwarding an authentication request generated by said mobile terminal toward said first authentication server associated with said network.

36. The system of claim 35, comprising at least one terminal in said set configured as an authenticator forwarding said authentication request generated by said mobile terminal toward said authentication server associated with said network.

37. The system of claim 27, wherein said network is configured for link-state type routing of said routing messages.

38. The system of claim 27,
wherein said authentication server is associated with said network,
wherein said network is further configured for including in said routing messages said set of authentication data of said mobile terminal signed by an authentication function.

39. The system of claim 27,
wherein the authentication server is associated with said network,
wherein said network is configured for including in said routing messages propagated over said network respective authentication data of said terminals in said set signed by an authentication function.

40. The system of claim 27,
wherein the network is further configured for including in said routing messages propagated over said network respective authentication data of said terminals, and wherein each of the terminals is capable of receiving said routing messages configured to verify the authenticity and integrity of said authentication data prior to propagating them to the other terminals.

41. The system of claim 40, wherein the terminals in said set capable of receiving said routing messages are configured to store the authentication data for said mobile terminal while authorizing traffic for said mobile terminal.

42. The system of claim 27, comprising:
a broadcasting mechanism over said network of respective authentication data related to said terminals in said set, wherein said mobile terminal, once successfully authenticated, is configured to detect said respective authentication data to establish thereby communication paths toward said terminals in said set.

43. The system of claim 27, wherein said communication mechanism is capable of communicating in a secure way within said network the successful outcome of said authentication procedure.

44. The system of claim 27, wherein said set of authentication data comprises ciphering keys associated with said mobile terminal.

45. The system of claim 44, comprising:
a broadcasting mechanism over said network of respective ciphering keys related to said terminals in said set, wherein said mobile terminal, once successfully authenticated, is configured to detect said respective ciphering keys to establish thereby communication paths toward said terminals in said set.

46. The system of claim 44, wherein said ciphering keys are generated in the form of per-user sets of ciphering keys.

47. The system of claim 44, comprising dynamically generated ciphering keys.

48. The system of claim 27, wherein authentication data are associated with said terminals.

49. The system of claim 48, comprising a terminal medium access control address associated with said authentication data.

50. The system of claim 49, wherein said terminal address is a link level address or a medium access control address of IEEE 802.11.

51. The system of claim 48, wherein the system is configured for periodically updating said authentication data associated with said terminals.

52. A communication network comprising a set of terminals, and having associated therewith a system according to claim 27 to control access of a mobile terminal to said network.

53. The network of claim 52, wherein said network is a mobile ad-hoc network.

54. A non-transitory computer readable medium encoded with a computer program product loadable into a memory of at least one computer and comprising software code portions for performing the method of claim 1.

55. The method of claim 1, further comprising:
selectively blocking via the terminals in the set, traffic generated by said mobile terminal until said mobile terminal obtains access to said network.

56. The system of claim 27,
wherein said terminals in the set are configured for selectively blocking traffic generated by said mobile terminal until the mobile terminal obtains access to said network.

* * * * *